United States Patent [19]

Aggen

[11] 4,436,226
[45] Mar. 13, 1984

[54] MATERIAL METERING DEVICE

[76] Inventor: Alvin F. Aggen, 2750 Sailor Ave., Ventura, Calif. 93001

[21] Appl. No.: 290,419

[22] Filed: Aug. 6, 1981

[51] Int. Cl.$^3$ .............................................. G01F 11/00
[52] U.S. Cl. .................................. 222/280; 222/282; 222/415; 222/310; 198/455
[58] Field of Search ............... 198/453, 455, 534, 530, 198/622, 620; 222/283, 282, 290, 342, 343, 408, 415, 280, 281, 310

[56] References Cited

U.S. PATENT DOCUMENTS

| | | | |
|---|---|---|---|
| 1,075,891 | 10/1913 | Ayars | 198/453 |
| 1,365,173 | 1/1921 | Jespersen | 222/415 |
| 1,537,123 | 5/1925 | Leopold | 222/415 |
| 1,617,228 | 2/1927 | Woodward | 222/415 |
| 1,674,634 | 6/1928 | Brueggemann | 222/415 |
| 2,601,944 | 5/1949 | Hansen | 226/22 |
| 3,154,117 | 10/1964 | Florin | 141/144 |
| 3,164,301 | 1/1965 | Hargreaves et al. | 222/415 |
| 3,587,675 | 6/1971 | Di Tucci | 141/125 |
| 3,934,706 | 1/1976 | Tice | 198/32 |
| 4,010,778 | 3/1977 | Aggen | 141/9 |
| 4,098,390 | 7/1978 | Calvet | 198/396 |
| 4,105,398 | 8/1978 | Dische et al. | 432/121 |

FOREIGN PATENT DOCUMENTS 736793  6/1966  Canada ................................. 198/453

Primary Examiner—H. Grant Skaggs
Attorney, Agent, or Firm—Koppel & Harris

[57] ABSTRACT

A metering device for particulate material in which backups and caking of material is inhibited by the provision of a "live" metering gate consisting of an upper blocking section and a lower material contacting surface. The lower surface is continually moved in the direction of material flow at a speed approximately equal to or slightly greater than the material flow speed. An elongate rotatable rod carried at the lower end of a blocking plate preferably provides the material contacting surface.

The gate is vertically adjustable so that the volumetric flow rate of material can be controlled. In a preferred embodiment the gate is located above the end of the material bearing surface and is adjustable along an axis which diverges from vertical by an appreciable angle, preferably about 45°.

The transverse dimension of metered material is also controlled by means of two blocking members which extend inwardly toward each other from behind the gate. The clearance between the blocking members can be controlled to limit the width of metered material to a desired amount, and also to achieve a singulated metering pattern.

9 Claims, 9 Drawing Figures

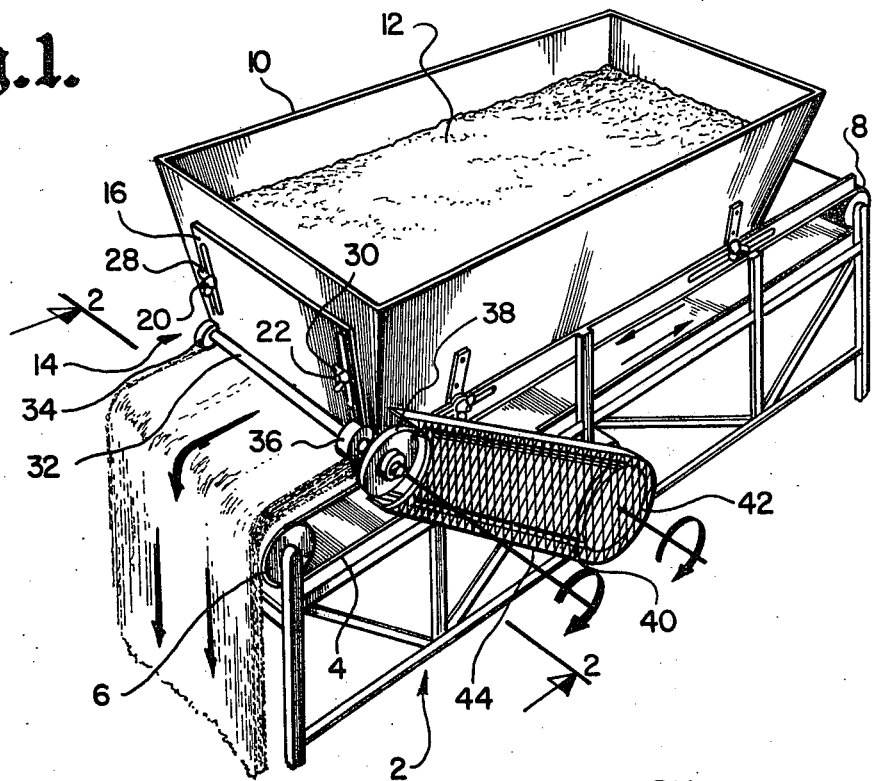
Fig. 1.
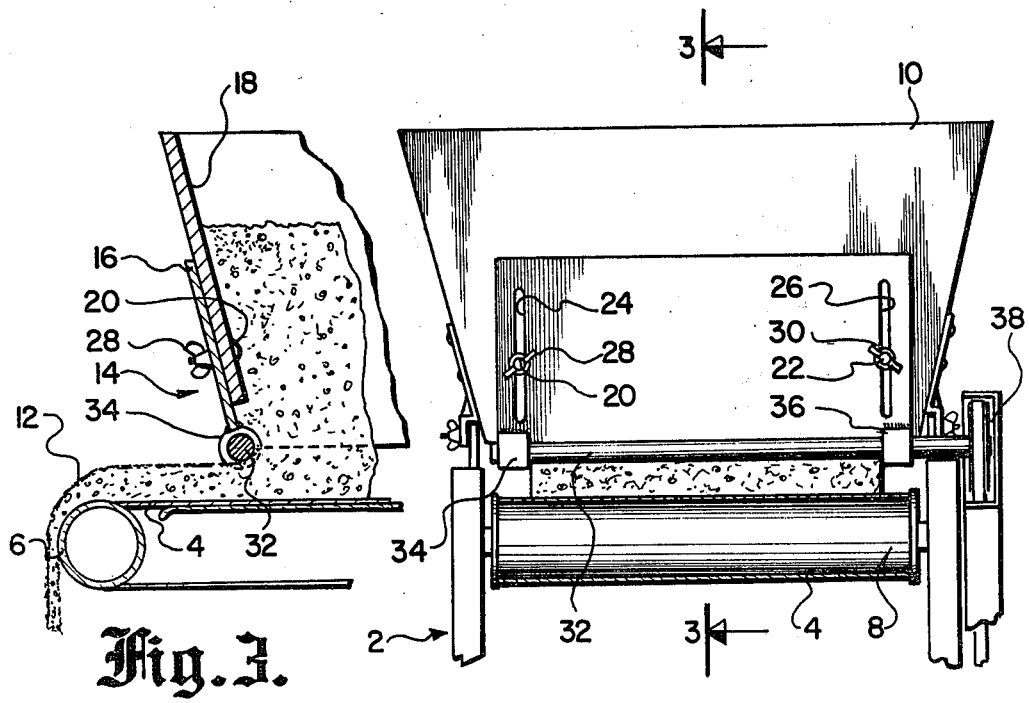
Fig. 2.
Fig. 3.

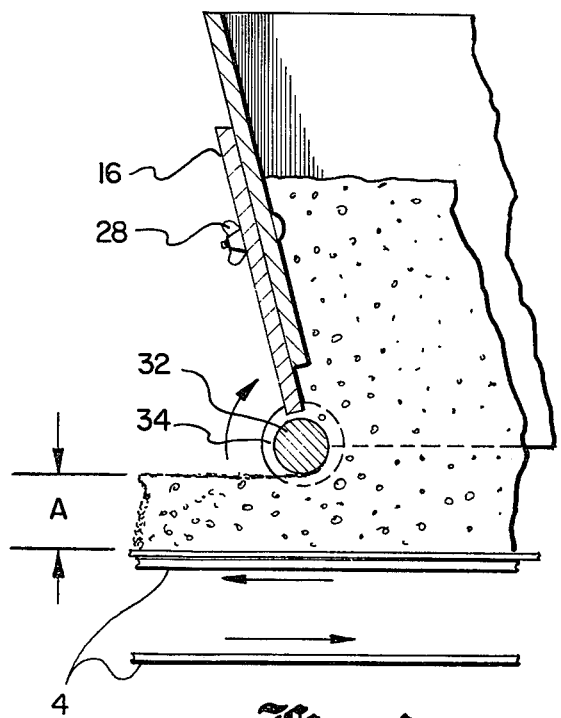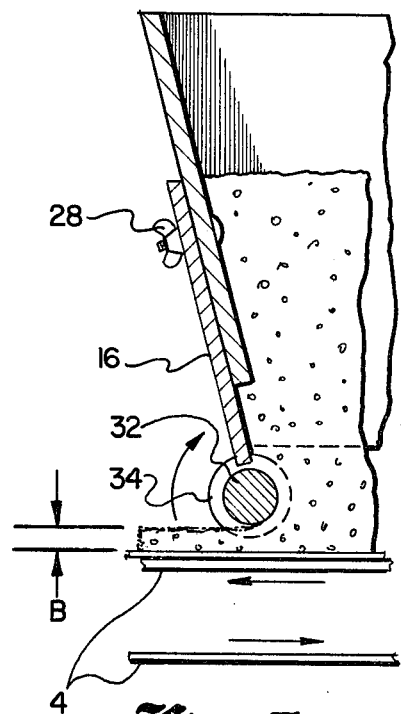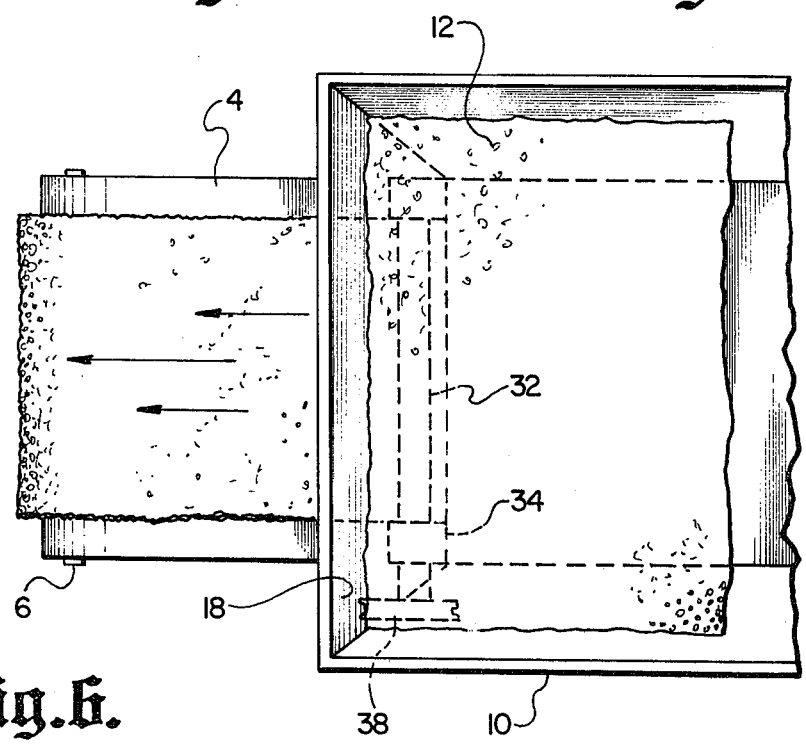

MATERIAL METERING DEVICE

BACKGROUND OF THE INVENTION

1. Field of the Invention

This invention relates to apparatus for controlled metering of particulate material, and more particularly to apparatus capable of controlled metering of agricultural products.

2. Description of the Prior Art

It is desirable in many applications to meter a flow of particulate material such as various agricultural products with a controlled, uniform thickness. For this purpose a form of gate has frequently been used which consists of a metal plate or block positioned at a desired height above a conveyor belt along which the material is moved. The thickness of the material permitted to pass under the gate is limited by the clearance between the plate and the conveyor belt, the remaining material being held back by the gate.

One problem frequently encountered with this type of metering arrangement is that light fluffy materials such as flour, many fertilizers, powdered lime and certain seeds have a tendency to back up at the gate and interfere with the even metering of material. The material typically begins to bridge or back up above the gate, with the bridging effect gradually expanding in a downward direction. The result is an uneven metering of material at an average thickness less than the amount desired, and if left undisturbed in some cases can eventually cut off the flow of material altogether.

One prior art device which attempts to alleviate some of these problems is disclosed in U.S. Pat. No. 3,154,117 to Florin. In this patent an endless belt is supported by a framework above a horizontal conveyor belt. An adjustable pivot mount is provided to enable the endless belt to be moved to and from the conveyor belt. Turning of the endless belt is said to aid in forcing material out along the conveyor belt to a downstream filling compartment, and at the same time limits the amount of material that will feed out along the conveyor belt at any given instant. Near the end of the conveyor belt a series of raking fingers are secured to a rotatable shaft. The shaft is rotated, apparently in a direction such that the movement of the raking fingers adjacent the conveyor belt is opposite to the direction of the conveyor belt movement. The fingers pick material off of the conveyor belt as it approaches the filling compartment, thereby preventing large quantities of the material from being suddenly dropped into the compartment.

While the Florin patent may address some of the problems outlined above, the endless belt and rake mechanism proposed are quite bulky, and would appear to add considerably to the size, complexity and cost of the metering apparatus.

Another desirable characteristic in a metering device for certain applications is the ability to accomplish "singulated" metering, ie., metering of one particle at a time in a single line. This ability is important, for example, in feeding certain seeds for planting. In addition to the possible problems of backups caused by an overhead gate, it is also important that the device meter in a fashion that produces only a single line of separated particles. Several methods have been used in the prior art to accomplish a singulated feed. In one approach seeds are carried inside a perforated rotating drum. Air pressure keeps the seeds inside the drum until the drum is rotated to a position at which the air pressure is cut off, permitting seeds to fall into a trough for metering. Another method uses a small cup about the size of a seed to capture one seed at a time from a pile, while in a third method, used mostly for laboratory work, seeds are captured one-at-a-time by a vaccum syringe.

An example of a device for singulated metering is disclosed in U.S. Pat. No. 4,105,398 to Disch et al. This device is designed to permit random loading of work pieces for passage through a furnace. An aligning means is provided in the form of a funnel, one side wall of which is movable to align the randomly positioned work pieces in single file. The position of the other sidewall forming the funnel is fixed. While this arrangement is disclosed as being applicable to the loading of metal workpieces for passage through a furnace, it might be applicable to the movement of particulate material in general. However, the workpieces illustrated in the patent are quite large and all lie directly on the conveyor, rather than being piled on top of each other. Accordingly, no provision is made for controlling the height of workpieces transported by the system, such as the gate mechanisms referred to above.

SUMMARY OF THE INVENTION

In view of the above problems associated with the prior art, the principle object of the present invention is the provision of a novel and improved system for metering particulate material and at the same time controlling the depth of the metered material without causing backups or clogging at the metering gate.

Another object is the provision of a novel and improved metering device for particulate material which meters the material at a controlled, even depth.

Yet another object is the provision of a metering device as described above in which the width as well as the thickness of the metered material is controllable, and which is capable of a singulated metering of appropriately sized particles.

In the accomplishment of these and other objects of the invention, means are provided for dispensing particulate material onto a moveable material support surface such as a conveyor belt. A gate is positioned above the material support surface in the path of the moving material, the gate having a lower surface positioned to contact the moving material and preventing metering of material above the level of the lower gate surface. The lower gate surface is continuously moved in the direction of the material flow, preferably at a speed approximately at or slightly greater than the speed of material movement, thereby retarding clogging of metered material at the gate.

In a preferred embodiment the gate comprises an upper blocking plate with a generally cylindrical rod held at its lower end in the path of the moving material. Means are provided for rotating the rod about its axis, resulting in a smooth flow of material past the gate without clogging. The vertical position of the gate above the material support surface is adjustable so that the depth of metered material can be controlled. In one embodiment the gate is positioned above the end of the conveyor belt, its position being adjustable along an axis at approximately a 45° angle from vertical in the direction of material movement.

In accordance with another feature of the invention, positionable blocking members are located adjacent the upstream side of the gate and extend inwardly towards the center of the conveyor belt from each side. The inward extension of the blocking members is adjustable, permitting a control over the width of particulate material passed through the gate. Singulated metering of appropriately sized particles is achieved by selecting a clearance between the inward ends of the blocking members and a vertical gate clearance both slightly greater than the expected particle size.

These and other objects and features of the invention will be apparent to those skilled in the art from the following detailed description of preferred embodiments thereof, taken in conjunction with the accompanying drawings in which:

DESCRIPTION OF THE DRAWINGS

FIG. 1 is a perspective view of a metering device for particulate material embodying the present invention;

FIG. 2 is a sectional view taken along the line 2—2 of FIG. 1;

FIG. 3 is a partial sectional view taken along the line 3—3 of FIG. 2;

FIGS. 4 and 5 are partial sectional views similar to FIG. 3 showing two different positions of the metering gate;

FIG. 6 is a partial plan view of the metering device shown in FIG. 1;

DESCRIPTION OF PREFERRED EMBODIMENTS

Figure 7:
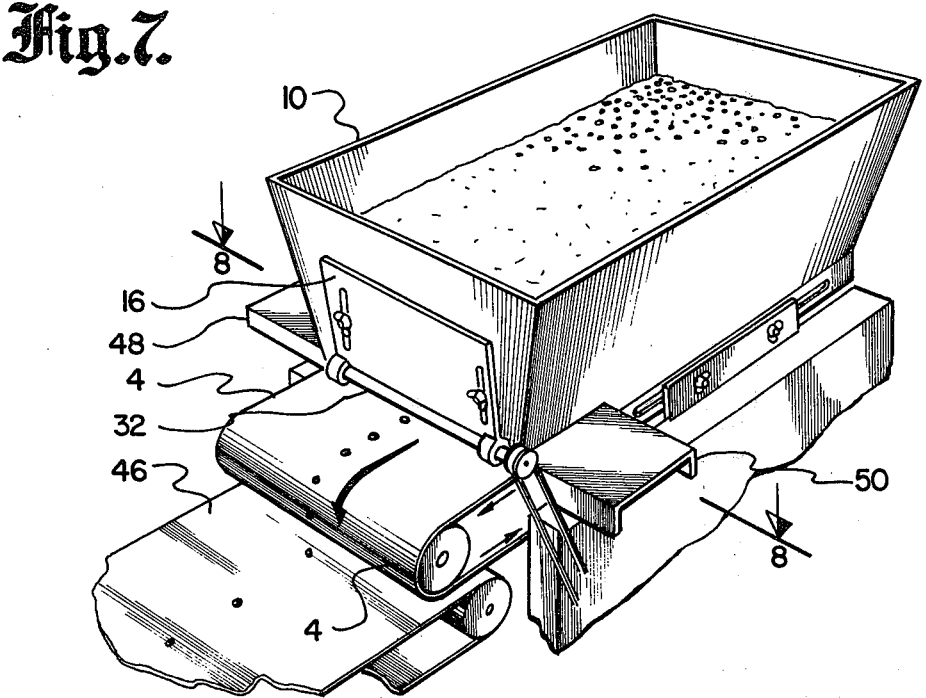
FIG. 7 is a perspective view of another embodiment of the invention which includes means for controlling the width as well as the height of metered material.

Referring first to FIGS. 1 and 2, the metering system of the present invention is shown mounted on a support structure generally indicated by numeral 2 and consisting of a network of interconnected beams and rods. Support structure 2 can be mounted on a vehicle when it is desired to distribute metered material such as fertilizer or seed over a wide area, or it can be stationery for applications such as a conveyor system for moving coal from a coal pile to a furnace or boiler. A conveyor belt 4 is wound around forward and rear rollers 6 and 8, respectively, the upper surface of the conveyor belt providing a support surface for the metered material. Supported directly above conveyor belt 4 is a hopper 10 containing a quantity of particulate material 12 such as seed, fertilizer, lime, coal, etc. An opening is provided in the bottom of hopper 10 to feed the material 12 onto belt 4.

Means (not shown) are provided for rotating rollers 6 and 8 so that the upper surface of conveyor belt 4 moves to the left in FIG. 1. A metering gate generally indicated by reference numeral 14 is located downstream from hopper 10 in the direction of travel of the upper conveyor belt surface. Gate 14 may either be formed as an integral part of the front end of the hopper, or may be provided as a separate mechanism mounted on support structure 2 either adjacent to or spaced downstream from hopper 10.

Gate 14, which is best seen in FIG. 3, comprises an upper blocking portion and a lower "live" portion the circumference of which moves in the direction of material flow to inhibit backups of material at the gate. The upper blocking portion of gate 14 comprises blocking gates 16 and 18. A pair of bolts 20, 22 extend through openings in plate 18 and slots 24, 26 respectively in forward plate 16, and the two plates are clamped together by means of wing nuts 28, 30 tightened onto bolts 20, 22. The vertical clearance of blocking plate 16 above conveyor belt 4 can be adjusted by loosening wing nuts 28, 30 adjusting the vertical position of the plate and then retightening the wing nuts.

The "live" portion of the metering gate shown in the drawings consists of an elongated, generally cylindrical rod 32 held at the lower end of gate 16 by collars 34, 36 formed integrally with plate 16. Rod 32 is preferably made of metal, and has a generally smooth exterior surface. A pulley wheel 38 is affixed to one end of rod 32 extending outwardly from collar 36. Pulley wheel 38 is connected by a drive band 40 to a drivewheel 42, which in turn is connected to a power source (not shown). A protective cover 44 protects the user from the moving components.

Drivewheel 42 is rotated in a clockwise direction as seen in FIG. 2, causing pulley wheel 38 to rotate rod 32 about its axis in the same clockwise direction. As best seen in FIG. 3, particulate material 12 is moved to the left by conveyor belt 4 and is metered through the gate opening established between rod 32 and the upper surface of the conveyor belt. It has been found that, when the speed of conveyor belt 4 is coordinated with the rotational speed of rod 32 such that the rod's outer circumference is moving at a speed approximately equal to or slightly greater than that of the conveyor belt, particulate material will be metered through the gate in an even flow without backing up behind the gate entrance. It is believed that this results from the elimination of a fixed point from which bridging or compacting of the particulate material can begin, and also because the rotating rod to some extent assists in pushing the particulate material in the direction of travel. In addition to preventing plugging of the gate, the improved metering mechanism described herein has also been found to produce a more uniform depth of metered material exiting from the gate.

Referring now to FIGS. 4 and 5, the adjustment feature is shown by which the volumetric flow rate of metered material can be controlled. In FIG. 4 blocking plate 16 has been moved to an upward position by lifting the plate upwards and tightening nuts 28 and 30. In this position the thickness or depth A of metered material approaches a maximum level, resulting in a high volumetric flow rate of material. In FIG. 5 nuts 28, 30 have been loosened, plate 16 moved downward so that the upper ends of slots 24, 26 are near bolts 20, 22, and nuts 28, 30 retightened to secure plate 16 in the lower position. At this setting the depth of metered material is reduced to dimension B, resulting in a considerably reduced volumetric flow rate. In this manner the rate at which material is metered can easily be controlled.

Figure 8:
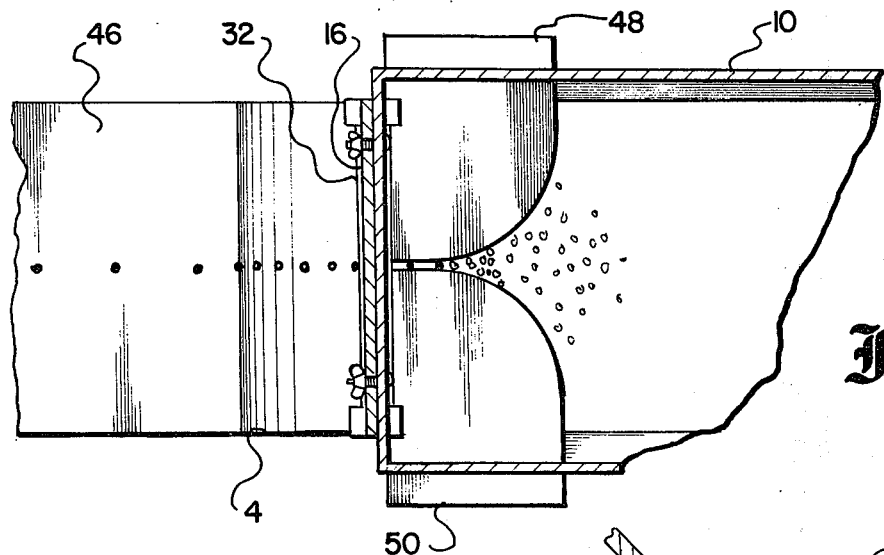
FIG. 8 is a sectional view taken along the line 8—8 of FIG. 7.

Referring now to FIGS. 7 and 8, another embodiment of the invention is shown which is particularly useful for metering seeds or other discrete particles in a singulated, one-at-a-time pattern. In this embodiment a second conveyor belt 46 is positioned below and caused to move faster than conveyor belt 4. Metered particles are dropped off the edge of belt 4 and carried along by belt 46 with an increased spacing between particles, the exact spacing being determined by the difference in speeds between the two belts. This general type of metering system is shown in my U.S. Pat. No. 4,010,778 issued Mar. 8, 1977.

A pair of blocking members in the form of channel bars 48, 50 are inserted through appropriate slots in the opposite side walls of hopper 10 and extend inwardly toward the center of conveyor belt 4. The inner ends of members 48, 50 are rounded, tapering away from each other so that the clearance between members 48, 50 is at a minimum immediately adjacent the metering gate, with the clearance progressively increasing further away from the gate. In this manner the width of the material metered through the gate is limited to the minimum clearance between members 48, 50.

Members 48, 50 are shown as being inserted directly into the sides of hopper 10 in FIGS. 7 and 8. Alternately, if the gate is positioned forward of hopper 10 rather than formed integrally with it as shown in the drawings, separate mounting apparatus would be provided to hold the two members. In either case members 48, 50 preferably extend from just above belt 4 to a height at least as great as the maximum vertical gate clearance. The two members can be moved in and out to adjust their positions relative to each other, and thereby adjust the width of the particulate material metered through the gate.

This arrangement is particularly useful when it is desired to meter individual particles such as seeds in a single line. For this application the vertical position of block 16 is adjusted so that the clearance between conveyor belt 4 and the lower end of rod 32 is about 25% greater than the anticipated seed size, and members 48 and 50 are positioned to provide the same amount of transverse clearance. Suitable adjustment mechanisms such as wormgear drives and calibrating scales could be provided to assure accurate vertical and horizontal clearances. The achievement of a singulated flow of particles can be achieved only for particles having a certain minimum size; singulation is not achieved for much smaller particles, such as marigold seeds, which tend to stick together.

Figure 9:
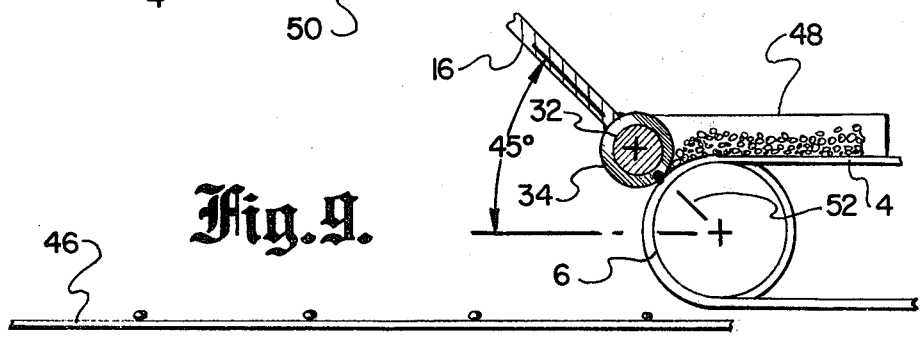
FIG. 9 is a partial sectional view showing the alignment of the gate mechanism with the conveyor belt in another embodiment of the invention.

Referring now to FIG. 9, an embodiment of the invention is shown which is particularly useful in preventing a buildup or caking of soft, moist materials behind the gate. In this embodiment the gate is separated from the hopper and positioned over forward roller 6 so that the forward movement of particles on belt 4 terminates approximately below the gate. Plate 16 is adjustable along an axis 52 which diverges from vertical by an appreciable amount, preferably about 45°, and which preferably also extends through the center of roller 6. With this arrangement both vertical and horizontal clearances are achieved between rod 32 and conveyor belt 4, with both clearances being adjustable by a single adjustment of plate 16. Members such as 48, 50 for controlling the transverse width of the metered materials could again be provided in the embodiment of FIG. 9.

While particular embodiments of my invention have been shown and described, various modifications and alterations will occur to those skilled in the art. Accordingly, it is intended that the invention be limited only in terms of the appended claims.

I claim:

1. A metering device for particulate material, comprising:
    forward and rear rollers for supporting a conveyor belt,
    a flexible conveyor belt wound about the rollers,
    means for dispensing particulate material onto said conveyor belt,
    means for rotating at least one of the rollers to rotate the conveyor belt with its upper surface moving toward the forward roller,
    a gate having a lower material contacting surface, said gate comprising a generally cylindrical elongate rod positioned generally above and forward from the forward roller with its axis generally parallel to the roller axis, and a material blocking surface above said rod, said rod cooperting with the forward roller to define a gate opening which prevents material above the level of the lower rod surface from being metered past the gate,
    means for adjusting the position of the gate along a path which extends upward and forward from the forward roller to control the volumetric metering rate and permit material being metered past the gate to fall downwardly, and
    means for continuously rotating the rod so that its lower surface moves in the direction of material flow, thereby retarding clogging of metered material at the gate.

2. The metering device of claim 1, wherein the rod rotating means is coordinated with the roller rotating means so that the lower rod surface moves in the direction of material movement at a speed approximately equal to or slightly greater than the conveyor belt speed.

3. The metering device of claim 1, said gate adjustment means adapted to adjust the gate clearance along an axis which is approximately 45° from vertical.

4. The metering device of claim 1, further comprising means immediately upstream from the gate from the direction of material flow for adjusting the effective width of the conveyor belt transverse to the direction of material flow.

5. The metering device of claim 4, said means for adjusting the effective width of the conveyor belt comprising a pair of positionable blocking members adjacent the gate on the upstream side thereof and extending inwardly towards the center of the conveyor belt from each side thereof, the inward extension of said blocking members being adjustable to control the width of particulate material presented to the gate, whereby singulated metering of appropriately sized particles may be achieved by selecting a clearance between the inward ends of the blocking members and a gate clearance slightly greater than the expected particle size.

6. The metering device of claim 5, the inward end of each blocking member being shaped such that the clearance between the members increases from a minimum clearance immediately adjacent the gate to progressively greater clearances further away from the gate.

7. The metering device of claim 1, said gate comprising a blocking plate having rod support openings at its lower end, with said rod extending through and carried by said openings.

8. The metering device of claim 7, said rod having a pulley receiving surface at one end, and said rod rotating means comprising a mechanized pulley system for rotating the rod.

9. The metering device of claim 1, the position of said gate being adjustable along an axis the extension of which approximately intersects the forward roller axis.

* * * * *